April 12, 1960    J. J. CRAVEN, JR    2,932,771
PANEL RETAINING STRUCTURE
Filed May 16, 1957
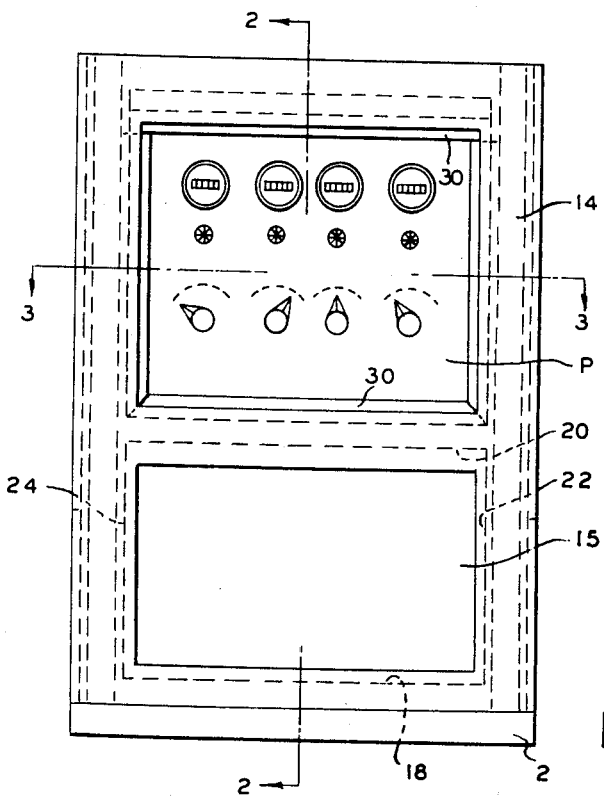
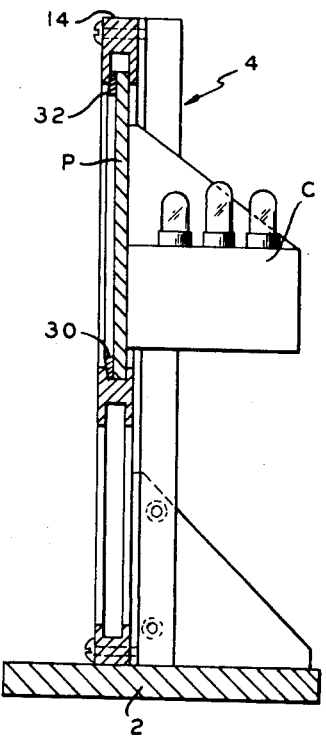
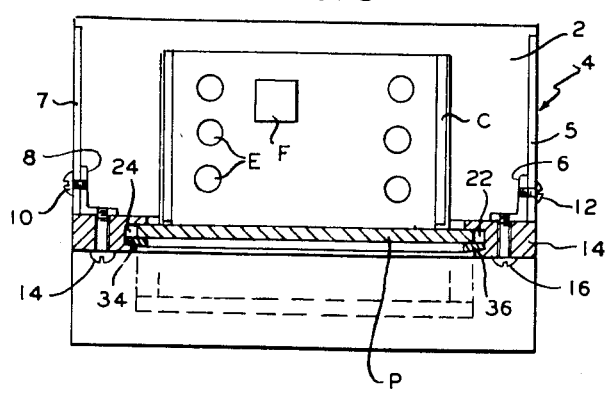
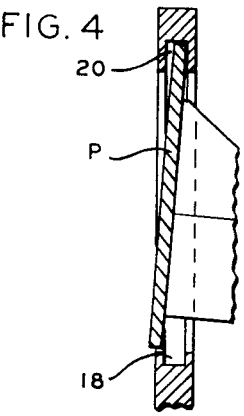
INVENTOR.
James J. Craven Jr.
BY
ATTORNEY United States Patent Office 2,932,771
Patented Apr. 12, 1960

2,932,771

PANEL RETAINING STRUCTURE

James J. Craven, Jr., Waltham, Mass.

Application May 16, 1957, Serial No. 659,564

1 Claim. (Cl. 317—99)

This invention relates to a panel retaining structure and, more particularly, to a panel retaining frame and locking strip assembly for use in removably securing a panel, or a panel and chassis unit within an electronic rack, as well as various other type housing members and panel mounting devices.

In mounting instrument panels, as well as instrument panels and chassis assemblies, one common arrangement is to employ an enclosure body such as an electronic rack and to secure the panel edges to the rack by means of a plurality of screw fastenings. These screw fastenings are threaded into openings suitably formed in the rack. In order to remove a panel or panel and chassis from such a rack for repair purposes, it is, of course necessary to take out each screw and then replace it when the panel is re-assembled. This necessitates a considerable amount of time and handling and involves a great deal of inconvenience whenever a repair has to be made in a component supported on the panel or chassis.

It is an object of the present invention to deal with this problem and to devise a combination panel retaining structure by means of which the use of threaded screw separate fasenings may be largely eliminated and, yet, a panel or panel and chassis unit may be installed or removed very rapidly and conveniently. Another object of the invention is to provide a relatively inexpensive panel retaining frame and locking strip assembly which can be very rigidly secured without requiring special tools and without the need for any particular skill.

With the foregoing objectives in mind, I have devised a novel panel retaining assembly comprising a specially channelled frame and locking strip unit which can be readily combined with a conventional electronic rack or similar mounting device. The channelled frame and locking strip components are so constructed and arranged with respect to one another that various types of panel or panel and chassis assemblies may be combined with the channelled frame and detachably secured in a desired position by means of the locking strips. The frame itself may be of sectional construction or may consist of a unitary member and, in the case of the latter, may be designed and constructed so as to provide a single panel receiving aperture or a plurality of panel receiving apertures.

These and other objects and novel features will be more clearly understood and appreciated from the following description of a preferred embodiment of the invention selected for purposes of illustration and shown in the accompanying drawings, in which Fig. 1 is a front elevational view of one form of frame construction of the invention showing an instrument panel and chassis assembly removably secured therein;

Fig. 2 is a cross-section taken on the line 2—2 of Fig. 1;

Fig. 3 is a plan cross-section taken on the line 3—3 of Fig. 1; and

Fig. 4 is a detail cross-sectional view showing the panel and chassis assembly in a partly installed position.

In the structure shown in the drawings, numeral 2 denotes a base of some suitable form. The base may be a separate member or may comprise a bottom section of an instrument panel enclosure body generally denoted by the arrow 4 and comprising, for example, an electronic rack member of well-known type.

The enclosure 4 may be shaped in any one of various forms as, for example, a rectangularly shaped rack structure. At the corners of the rectangularly shaped rack structures are provided upright corner brackets of right angle cross-section, as 6 and 8, best shown in Fig. 3. These corner brackets may be permanently secured to sidewalls 5 and 7 or detachably secured by means of screws 10 and 12. Ordinarily, the corner brackets are also utilized to detachably support a conventional panel by means of screws which are driven through the panel into holes formed in the corner brackets at the front sections thereof.

In the present invention, however, I provide a special panel retaining frame body 14 which may be more or less permanently secured to the corner brackets by screws 14 and 16 or fastened in any other desirable manner at the front of the conventional rack. This special panel retaining frame 14, in one desirable form, may consist of a rigid plate of metal constructed of a size such that it may overlap and close the front of the rack 4, as suggested, for example, in Figs. 1 and 3. The frame member may, in accordance with the invention, have one or more special panel receiving apertures which, in conjunction with locking bar means hereinafter described, constitute a novel combination of panel retaining parts.

In the panel receiving frame 14, shown in Fig. 1, there are two panel receiving apertures, each of which is of the same construction. For purposes of illustration, one frame aperture 15 is empty and the other is shown supporting a panel P having a chassis C for supporting electrical components.

Along these edges of the frame which define the panel receiving apertures, I provide channels which, in a preferred form of the invention, extend along four sides of each aperture and which are formed of a thickness greater than the thickness of the panel. Referring in detail to the upper aperture shown in Fig. 1, in which the panel P is mounted, numeral 18 denotes a bottom channel and numeral 20 indicates an upper channel having a depth which substantially exceeds the depth of channel 18. Numerals 22 and 24 refer to channels formed at opposite sides of the aperture 15 communicating with channels 18 and 20. These side channels are preferably constructed in such a manner that inner retaining edges are present against which the panel P may abut in a fully secured position and, yet, the aperture at the outer exposed surfaces of frame 14 is large enough to readily accommodate the width of the panel P.

By means of the arrangement described, panel P may be inserted through the aperture and pushed upwardly so as to assume a position such as that shown in Fig. 4 in which the top edge of the panel is lifted upwardly into the top of the channel 20 whereby the lower edge of the panel P may be passed in over the front edge of channel 18, as shown. Thereafter, the panel is dropped down into channel 18 and firmly pressed against the inner retaining edges of the channel. I then secure the panel P in the position noted by means of upper and lower locking bars 30 and 32 (Fig. 2) and, where it is desired to employ side locking bars, I may also employ the members 34 and 36, as shown in Fig. 3.

An important feature of these locking bars is the provision of a tapered cross-section form which will furnish an average thickness adapted to allow the bars to take a position which is best shown in Fig. 2. This taper is located along the bottom edges of the bars 30, for example, and allows for simply snapping the bars into a locking position by a light pressure. Similarly, the upper locking bars 32 may be tapered at their upper edges to be forced into their respective channels. It will be seen, therefore, that to secure the panel in place it is necessary merely to employ the locking bars which can be pressed into locking position by hand without the use of any tool whatever.

It will be observed that I preferably construct the locking bars 30 and 32 of a length such that they extend from one end to the other of their respective channels and to construct the side bars of a length to fit snugly against the bars 30 and 32. It will be apparent that the side bars then lock the upper and lower bars so that they cannot be dislodged or removed until the side bars are taken out. The ends of these bars may be either square or beveled. To remove any of these wedge-shaped locking bars, it is merely necessary to employ a sharp pointed tool to displace the bars laterally out of their channel portions and then the entire panel assembly is free to be withdrawn through the frame aperture out of the rack enclosure to carry out repairs or make other changes and thereafter be replaced without the use of screw or special handling tools.

It is intended that this detachable locking bar and frame construction may be manufactured and sold in various ways. For example, the channelled frame and locking bars may be combined with a panel as a complete assembly unit. In other cases the channelled frame may be secured in a front wall section of a rack or other enclosure body. In still other cases the channelled frame may be manufactured in sections of different lengths which can be fitted into any size panel aperture and solidly secured to comprise a panel retaining frame.

While I have shown preferred embodiments of the invention, it should be understood that various changes and modifications may be resorted to in keeping with the spirit of the invention as defined by the appended claim.

Having thus described my invention, what I claim is:

In combination with a rack structure for housing electrical components, a frame adapted to be secured at one side of the rack structure, said frame being recessed to present an aperture, an electrical component supporting panel detachably mounted in the aperture and having electrical components mounted at one side thereof, said aperture edges being formed with a lower channel, an upper channel whose depth exceeds the depth of the lower channel, and two side channels, said panel having a height which exceeds in magnitude the distance between the top and bottom edges of the aperture but which is less than the distance between the bottom of the lower channel and the top of the upper channel whereby the panel may, when supported in the lower channel, have its upper panel edge engaged against an outermost section of the frame adjacent the upper channel, means comprising a bevelled locking strip removably wedged between the bottom edge of the panel and an adjacent surface of the bottom channel, and means consisting of vertically extending strips disposed in the side channels upon opposite ends of the bottom bevelled strip in locking relationship therewith, said side strips being detachably secured in wedged relationship between respective vertical edges of the panel and adjacent channel surfaces.

References Cited in the file of this patent

UNITED STATES PATENTS

| | | |
|---|---|---|
| 1,692,064 | Trogner | Nov. 20, 1928 |
| 1,738,172 | Judson | Dec. 3, 1929 |
| 2,258,973 | Cross et al. | Oct. 14, 1941 |
| 2,572,618 | Haury | Oct. 23, 1951 |

OTHER REFERENCES

Tektronix Bull.: March, 1956, 4 pages; published by Tektronix Inc., Portland, Oregon.